2,921,012
PRODUCTION OF HARD AND FLEXIBLE MICROCRYSTALLINE WAXES

Alan Collier, Sunbury-on-Thames, England, assignor to The British Petroleum Company Limited, London, England, a British joint-stock corporation No Drawing. Application August 6, 1957
Serial No. 676,506

5 Claims. (Cl. 208—25)

This invention relates to the production of hard and flexible waxes from single-stage solvent-recrystallized wax which has been prepared from so-called bright stock slack wax by single-stage recrystallization at a temperature within the range 20–60° F. Bright stock slack wax is obtained from the residues of the vacuum stage of crude petroleum distillation and is often called crude microcrystalline wax since it contains a large proportion of microcrystalline wax having good flexibility and good adhesive properties.

The principal object of the invention is to provide a process for producing a good quality flexible wax which is suitable for laminating and coating purposes or for use as a modifier for increasing the flexibility of paraffin waxes, and a hard wax suitable for wax polishes. Flexible waxes for laminating and coating purposes should be non-tacky and firm to the touch, i.e. they should have a melting point above about 140° F. and a penetration at 77° F. of not more than about 50 mm./10 (Institute of Petroleum Standard Method of Test No. 50/48).

According to the invention a process for producing hard and flexible waxes from a single-stage solvent-recrystallized bright stock slack wax feedstock, comprises dissolving the feedstock in a water-saturated wax solvent, adding solid urea, agitating the mixture at an elevated temperature to cause the straight-chain hydrocarbons present in the wax to form an adduct with the urea, separating the adduct by filtration, recovering flexible wax from the filtrate and decomposing the adduct to recover hard wax.

The separated adduct is preferably washed with fresh wax solvent at the reaction temperature before being decomposed. Decomposition of the adduct may be effected by the addition of boiling water which dissolves the urea leaving the adducted portion of the wax in solution in the occluded wash solvent.

The wax solvent used is preferably methyl-iso-butyl ketone (MiBK). Using MiBK, the wax/solvent ratio should preferably lie within the range from 1:5 to 1:10 gm./ml.

A number of examples of the invention will now be described.

EXAMPLES

Single-stage solvent-recrystallized bright stock slack wax obtained from a Middle Eastern crude oil was dissolved in water-saturated MiBK in a 1 gm./10 ml. wax/solvent ratio. The MiBK was saturated with water by allowing it to be stored over water. The maximum uptake of water by MiBK at room temperature (20° C.), is about 2% by volume. Solid urea in the weight ratio of 2 parts of urea to 1 part wax by weight was then added. The mixture was then stirred for 20 minutes using a disperator-type stirrer at a temperature of 160–170° F. when adduction took place. The mixture was then filtered through a stainless steel sinter, the retained adduct being washed with fresh MiBK at the reaction temperature. The decomposition of the adduct was effected by the addition of boiling water which dissolved the urea, leaving the adducted portion of the wax in solution in the occluded wash solvent. Recovery of the product waxes from the wax/solvent phases was carried out by distillation of the solvent from the phases.

The experiment was repeated using reaction periods of 10 minutes and 50 minutes. The properties of the waxes produced by these experiments are given in Table 1.

Table 1

Solvent: Methyl iso-butyl ketone
Solvent/wax ratio: 10/1; ml./gm.
Urea/wax ratio: 2/1; wt./wt.
Reaction Temperature: 160° F./165° F.

| Reaction time, minutes | Yields, wt. percent | | Melting point, °F. | | Penetration @ 77° F. | | Flexibility, cycles @ 0° C. | |
|---|---|---|---|---|---|---|---|---|
| | Adduct wax | Non-adduct wax | Adduct wax | Non-adduct wax | Adduct wax | Non-adduct wax | Adduct wax | Non-adduct wax |
| 10 | 10.5 | 89.5 | 194 | 159 | 4 | 36 | 1 | 270 |
| 20 | 24.3 | 75.7 | 187 | 147 | 5 | 46 | 1 | 1,000 |
| 50 | 25.6 | 74.4 | 186 | 147 | 9 | 49 | 1 | 1,000 |

It will be seen that a reaction period of 20 minutes was the most advantageous and for maximum adduction, the period should not be less than this. For a period less than 20 minutes the degree of adduction was appreciably reduced, while for a much longer period there was only a small increase in the percentage of wax adducted.

Further experiments were carried out using different urea/wax ratios. The results of these experiments are given in Table 2 and it will be seen that it is possible to vary the properties of the product waxes, according to requirements, by control of the urea/wax ratio.

*Table 2*

Solvent: Methyl iso-butyl ketone
Solvent/wax ratio: 10/1; ml./gm.
Reaction time: 20 minutes
Reaction temperature: 160° F./165° F.

| Urea/wax ratio, wt./wt. | Yields, percent wt. | | Melting point, °F. | | Penetration @ 77° F. | | Flexibility, cycles @ 0° C. | | Index differential of adduct wax |
|---|---|---|---|---|---|---|---|---|---|
| | Adduct wax | Non-adduct wax | Adduct wax | Non-adduct wax | Adduct wax | Non-adduct wax | Adduct wax | Non-adduct wax | |
| 0.25:1 | 5.25 | 94.75 | 195.8 | 159.8 | 4 | 37 | <1 | 25 | |
| 0.58:1 | 10.80 | 89.20 | 195.8 | 158.0 | 4 | 36 | <1 | 270 | 23 |
| 0.90:1 | 18.90 | 81.10 | 188.6 | 149.0 | 3 | 45 | <1 | >1,000 | 34 |
| 1.18:1 | 22.25 | 77.75 | 188.6 | 147.2 | 7 | 47 | <1 | >1,000 | 34 |
| 2.30:1 | 26.90 | 73.10 | 185.0 | 147.2 | 11 | 50 | <1 | >1,000 | 67 |
| 3.00:1 | 27.90 | 72.10 | 186.6 | 149.0 | 8 | 51 | <1 | >1,000 | 65 |

The flexibility test is carried out on a machine designed to rupture a wax strip by continuous flexing through a constant angle, the flexibility being given by the number of cycles required to rupture the strip.

"Index differential" is 10,000 times the difference between the refractive index of the wax at its setting point and 1.4365.

The index differential gives a measure of how far the refractive index is above that of normal paraffin hydrocarbons (R.I. 1.4365), and a high value therefore denotes a relatively high non-normal paraffin content.

I claim:

1. A process for producing hard and flexible waxes from a single-stage solvent-recrystallized bright stock slack wax feedstock, comprising dissolving the feedstock in a water-saturated wax solvent, adding solid urea, agitating the mixture at an elevated temperature of 160°–170° F. to cause the straight chain hydrocarbons present in the wax to form an adduct with the urea, separating the adduct by filtration, recovering flexible wax from the filtrate and decomposing the adduct to recover hard wax.

2. A process for producing hard and flexible waxes from a single-stage solvent-recrystallized bright stock slack wax feedstock, comprising dissolving the feedstock in water-saturated methyl isobutyl ketone, adding solid urea, agitating the mixture at an elevated temperature of 160°–170° F. to cause the straight chain hydrocarbons present in the wax to form an adduct with the urea, separating the adduct by filtration, recovering flexible wax from the filtrate and decomposing the adduct to recover hard wax.

3. A process according to claim 2, in which the solid urea is added to the wax solution in the weight ratio of 0.25–3.0 parts of urea to one part of wax.

4. A process according to claim 2, in which the wax feedstock is dissolved in the water-saturated methyl isobutyl ketone in a wax/methyl isobutyl ketone ratio range from 1:5 to 1:10 gm./ml.

5. A process according to claim 2, in which the agitation is carried out for a period of not less than 20 minutes.

References Cited in the file of this patent

UNITED STATES PATENTS

| | | |
|---|---|---|
| 2,546,328 | Arabian | Mar. 27, 1951 |
| 2,663,671 | Wiles et al. | Dec. 22, 1953 |
| 2,823,172 | Rumberger et al. | Feb. 11, 1958 |